Jan. 21, 1958

H. O. BACKSTROM 2,820,335

AIR BLOWER FOR A GRAIN WINDROWER

Filed Aug. 27, 1954

INVENTOR.
Henry O. Backstrom
BY
McMorrow, Berman & Davidson
ATTORNEYS

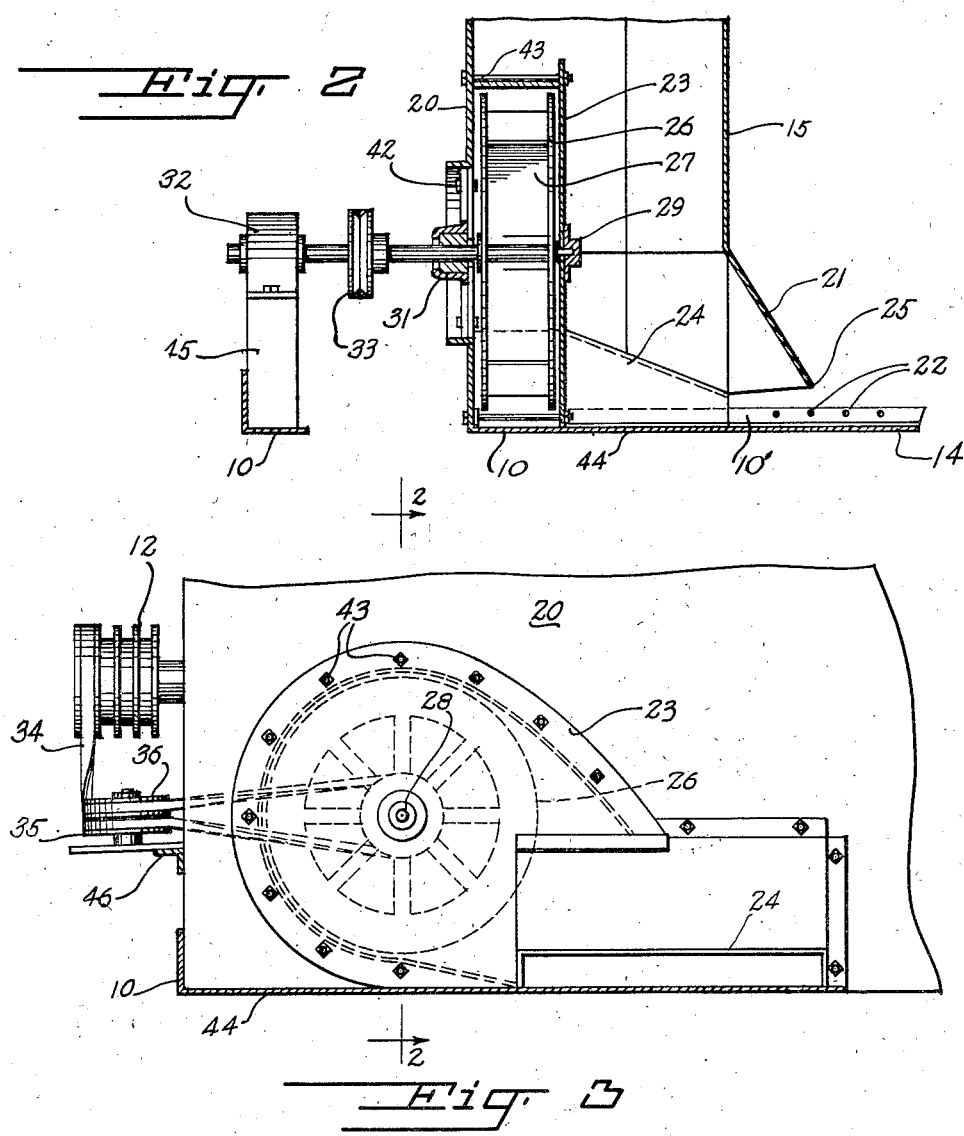

2,820,335

AIR BLOWER FOR A GRAIN WINDROWER

Henry O. Backstrom, Lake Bronson, Minn.

Application August 27, 1954, Serial No. 452,541

3 Claims. (Cl. 56—192)

The present invention relates to an improvement in a grain windrower and to a pneumatic means for preventing the loss of short grain heads from the windrow as it is formed by the windrow.

In the windrowers now provided, a main sickle bar cuts the grain stalks at a particular height above the ground so as to have a minimum length of stalk with the grain head in order that the following combine not be made to handle any more straw than necessary.

The straw as cut by the sickle bar lies in a swath and supports the grain heads in a windrow which is easily picked up by the combine for threshing.

The moving canvas platform which delivers the grain heads to the windrow fingers delivers grain to the windrow layer and some grain heads fall on the shields which project outwardly toward the canvas platform from the windshield. The grain falling near the inner platform windshield is called "scatterings" and is not mixed with the strands of straw and heads in the windrow, but falls through the short stubble to where it cannot all be reached by the rake of the combine.

The present invention therefore concerns itself with a device which may be attached to the windrower of this type and one which will pick up or blow these shorter grain heads and stalks into the larger mass of the longer stalks and heads in order that the scatterings are compacted into the windrow as it drops from the machine.

The principal object of the present invention is to provide a device to compact into the windrow formed by the windrower the grain heads and stalks formerly dropped by the windrow layer outside of the normal edges of the windrow.

Another object of the present invention is to provide such a device to compact the windrow and one which is inexpensive to construct and easily installed on the windrower without special tooling or alteration of the windrower.

These and other objects of the present invention will be apparent from the following description when considered in connection with the annexed drawings, in which:

Figure 2 is a sectional view taken on the line 2—2 of Figure 3;

Figure 3 is a side view, with parts omitted and with parts in section, taken on the line 3—3 of Figure 1.

Figure 1:
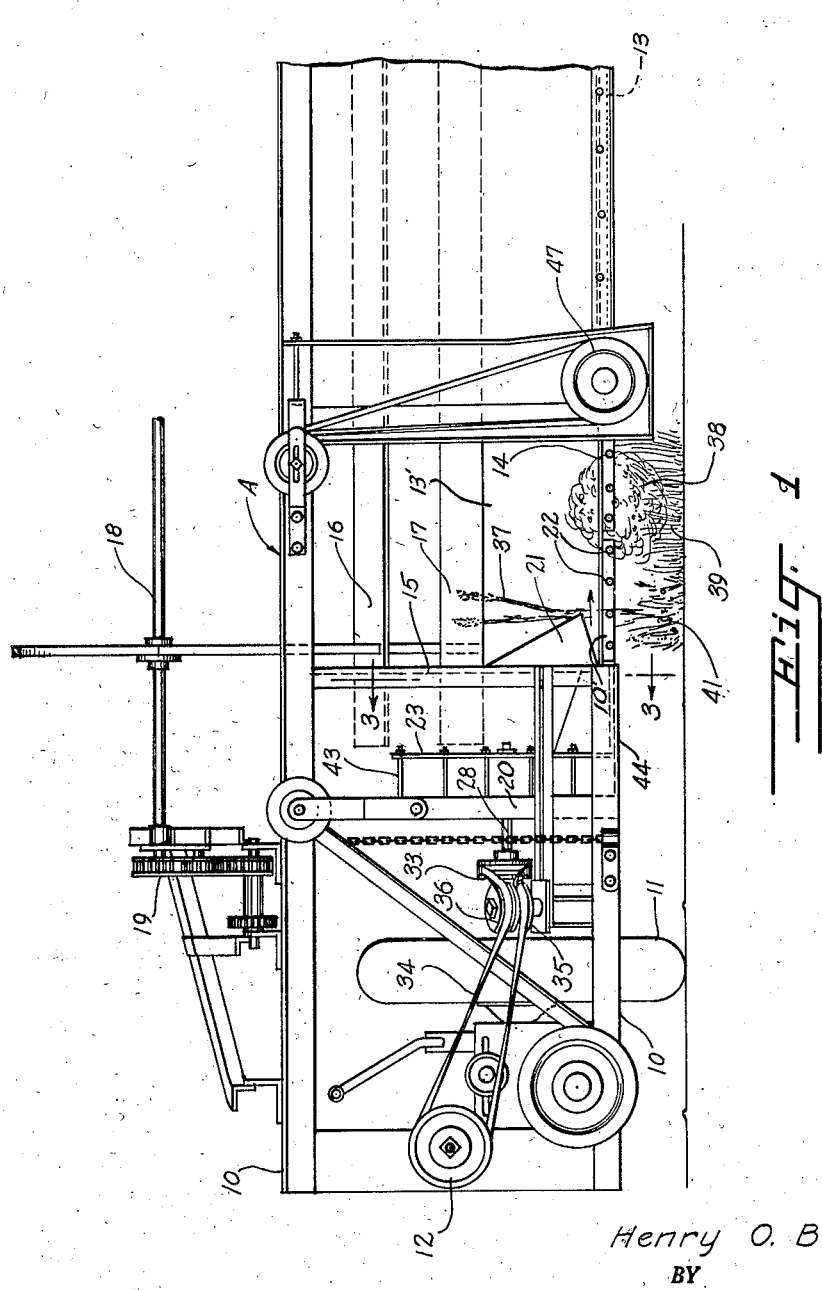
Figure 1 is a view in elevation of the inner end of a grain windrower as seen from the rear.

Referring in more detail to the drawing, in which like numerals indicate like parts throughout the several views, in Figure 1 a grain windrower, indicated by the reference character "A," is seen to have a frame 10 and a supporting wheel 11, the outer end of the windrower not being shown. A drive pulley 12 is connected to the power take-off of the tractor, not here shown, and by connections to be described later the power is transmitted to the platform 13 which moves in a horizontal plane on the windrower from the outer end toward the center thereof to deliver the severed grain heads and stems or stalks toward the windrow layer 14. The inner end of the windrower is provided with a windshield 15 which guides the grain toward the windrow layer 14 as it is swept downward by the reel, two blades 16 and 17 of which are seen in Figure 1, the reel shaft 18 being drivably connected to the gears 19 which are driven by the wheel 11 by means, not shown.

A plurality of spaced windrow fingers 22 are arranged inwardly of and in substantially the same horizontal plane as the platform 13. The fingers 22 are supported by their forward ends in the front sill 10' of the frame 10 of the windrower and extend rearwardly therefrom. Stalks of grain received from the platform 13 after cutting by the sickle bar (not shown) are supported on the fingers 22 and as the windrower moves over the field the stubble remaining in the field under the fingers extend between the fingers to remove the grain stalks in the windrow. An upstanding grain stalk-directing shield 21 is positioned inwardly of the fingers 22 and is supported on the lower end of the windshield 15 with its lower end adjacent and spaced above the portion of the fingers adjacent thereto to form a throat 13'.

A housing 23 is mounted on the frame 10 and against the panel 20 of the windrower and is provided at its lower end with a discharge outlet 24 which is adjacent to and below the lower edge 25 of the shield 21 and facing the one end of the platform 13. In the housing 23 is rotatably mounted a fan 26 having blades 27 and secured to a shaft 28 which is supported on one end by a bearing 29 and in an arbor 31. A pillow block 32 supports the other end of the shaft 28 and a pulley 33 on the shaft is connected to the drive pulley 12 by a V-belt 34 and the idling pulleys 35 and 36.

In operation, the tractor drives the drive pulley 12 and the fan 26 blows grain stalks and heads 37 falling on the shield 21 in the direction indicated by the arrow in Figure 1 to form the piled up windrow, indicated by the reference numeral 38, supported on the stubble 39, and not dropped into the position indicated at 41 where formerly the scatterings were found, as left there by the windrow layer fingers 22.

The alteration necessary to install the housing and fan is believed to be obvious. An air inlet hole indicated in Figure 2 by the reference numeral 42 is cut in the partition panel of the windrower and the blower housing 23 is secured over the hole 42 by the bolts 43. The discharge outlet 24 of the housing is then positioned so as to direct the air blast under the shield 21 at the lower end of the vertically extending inner platform windshield 15, the construction of which is conventional and in some instances is adjustable laterally to swing the shield 21 further over the windrow layer fingers 22. A diagonal sheet of floor panel 44 is installed to extend the bottom wall of the housing 23 outwardly to form the lower wall of the outlet 24 and to form a support for the housing by being secured at its rear end to the frame 10. A suitable jack stand 45 supports the pillow block 32 and a bracket 46 is bolted to the frame 10 to support the pulleys 35 and 36. The platform canvas 13 is driven by the pulley 47 and other gears and shafts are arranged conventionally to drive the reels and the sickle bars but are not illustrated here. The housing 23 and the fan 26 constitute a pneumatic means for accomplishing the object of the present invention, that of saving short and heavy grain heads otherwise lost in the formation of the windrow by the windrower.

While a single embodiment of the present invention has been here shown and described, other embodiments are contemplated and may be made and practiced within the scope of the appended claims without departing from the spirit of the invention.

What is claimed is:

1. In a power driven windrower including a platform movable in a horizontal plane, a plurality of spaced windrow fingers arranged inwardly of and in substantially the same horizontal plane as said platform, and an upstanding grain stalk-directing shield positioned inwardly of said fingers and having the lower end adjacent to and spaced above the portion of the fingers adjacent thereto to form a throat, the improvement consisting in a pneumatic means including a discharge outlet positioned so that the discharge outlet is directed toward said throat.

2. In a power driven windrower including a platform movable in a horizontal plane, a plurality of spaced windrow fingers arranged inwardly of and in substantially the same horizontal plane as said platform, and an upstanding grain stalk-directing shield positioned inwardly of said fingers and having the lower end adjacent to and spaced above the portion of the fingers adjacent thereto to form a throat, the improvement consisting in a fan mounted on said windrower and operatively connected to the source of power of the windrower and including a discharge outlet positioned so that the discharge outlet is directed toward said throat.

3. In a power driven windrower including a platform movable in a horizontal plane, a plurality of spaced windrow fingers arranged inwardly of and in substantially the same horizontal plane as said platform, and an upstanding grain stalk-directing shield positioned inwardly of said fingers and having the lower end adjacent to and spaced above the portion of the fingers adjacent thereto to form a throat, the improvement consisting in a housing mounted on said windrower on the side of said shield opposite said fingers, a fan rotatably mounted in said housing and being operatively connected to the source of power of the windrower, a discharge outlet connected to said housing and being positioned so that the discharge outlet is directed toward said throat.

References Cited in the file of this patent

UNITED STATES PATENTS

| | | |
|---|---|---|
| 718,458 | Holfert | Jan. 13, 1903 |
| 1,844,860 | Lindgren | Feb. 9, 1932 |
| 1,954,630 | Livesay | Apr. 10, 1934 |
| 2,288,238 | Goodall | June 30, 1942 |